(12) United States Patent
Cahall et al.

(10) Patent No.: US 8,714,655 B2
(45) Date of Patent: May 6, 2014

(54) REAR SEAT DIVIDER FOR MOTOR VEHICLE

(75) Inventors: Scott C. Cahall, Fairport, NY (US); Robert T. Kiesow, Victor, NY (US)

(73) Assignee: Wallyhoo, Inc., Fairport, NY (US)

( * ) Notice: Subject to any disclaimer, the term of this patent is extended or adjusted under 35 U.S.C. 154(b) by 266 days.

(21) Appl. No.: 13/042,498

(22) Filed: Mar. 8, 2011

(65) Prior Publication Data

US 2011/0227391 A1    Sep. 22, 2011

Related U.S. Application Data

(60) Provisional application No. 61/314,196, filed on Mar. 16, 2010.

(51) Int. Cl.
*B60R 21/00* (2006.01)

(52) U.S. Cl.
USPC ........................................ 297/464

(58) Field of Classification Search
USPC .......... 297/464, 463.2, 248, 232, 216.1, 481, 297/482
See application file for complete search history.

(56) References Cited

U.S. PATENT DOCUMENTS

| | | | |
|---|---|---|---|
| 3,648,306 A | 3/1972 | Auerbach | |
| 4,118,812 A | 10/1978 | Pangburn | |
| 4,938,401 A | 7/1990 | Weisbrodt et al. | |
| 4,951,965 A * | 8/1990 | Brown | 280/801.1 |
| 5,007,569 A | 4/1991 | Zarb | |
| D318,203 S * | 7/1991 | Zaghini | D6/601 |
| 5,054,837 A | 10/1991 | Chapman | |
| 5,123,707 A | 6/1992 | Wurzell | |
| 5,255,958 A | 10/1993 | Frischmann | |
| 5,971,487 A | 10/1999 | Passehl | |
| 6,142,574 A | 11/2000 | Alexander | |
| 6,250,700 B1 | 6/2001 | Traxler | |
| 6,260,903 B1 | 7/2001 | von der Heyde | |
| 6,502,859 B1 | 1/2003 | Svetlik | |
| 7,086,703 B1 | 8/2006 | Jones | |
| 7,131,703 B1 * | 11/2006 | Sheridan et al. | 297/465 |
| 7,594,288 B1 * | 9/2009 | Holliday et al. | 5/636 |
| 8,272,674 B2 * | 9/2012 | Vance | 296/24.46 |
| 2002/0180229 A1 | 12/2002 | Wheat | |
| 2006/0103155 A1 | 5/2006 | Spater et al. | |
| 2006/0238010 A1 * | 10/2006 | Yetukuri et al. | 297/410 |
| 2010/0146706 A1 * | 6/2010 | Siegner et al. | 5/626 |

* cited by examiner

*Primary Examiner* — David R Dunn
*Assistant Examiner* — Alexander Harrison
(74) *Attorney, Agent, or Firm* — Louis S. Horvath

(57) ABSTRACT

A divider for a rear seat of a motor vehicle is formed as a single, free-standing element having a block that is compressible and has shape memory, wherein the block has a pliable covering and has a base and a back surface. A lap restraint belt interface has a first slot that extends through the block for accepting an inserted lap restraint belt and the first slot is oriented for compressively urging at least a portion of the base against a bottom surface of the rear seat and a portion of the back surface toward a backrest when the inserted lap restraint belt is engaged. A second interface accepts a second restraint device and is oriented for adding a compressively urging force at least toward the backrest of the rear seat when the second restraint device is engaged.

16 Claims, 12 Drawing Sheets

REAR SEAT DIVIDER FOR MOTOR VEHICLE

CROSS REFERENCE TO RELATED APPLICATION

This application claims the benefit of Provisional Application Ser. No. 61/314,196, entitled "REAR SEAT DIVIDER FOR MOTOR VEHICLE", filed Mar. 16, 2010 in the names of Scott C. Cahall et al.

FIELD OF THE INVENTION

The present invention relates to separator devices in general, and in particular to barriers for reducing physical and/or visual contact between rear passengers in an automobile.

BACKGROUND

For families traveling with multiple small children, interaction between children in the rear seat can, at times, be undesirable and may lead to momentary familial disharmony. As is well known to those experienced in driving children about, even a slight conflict between otherwise well-mannered children can sometimes escalate into behavior requiring adult intervention and disturbing the emotional well-being of others in the vehicle. In extreme cases, passenger safety can even be endangered.

Clearly, the ideal solution to this problem is for parents and caregivers to foster behavior and sibling relationships that minimize interpersonal conflict and promote peaceful problem resolution. However, in practice, it has been found that other measures are needed, at least in the short term. In addition, there can be situations in which it is beneficial to separate a child from a pet or from other items in the motor vehicle.

One proposed alternative for preventing or alleviating this type of problem is providing a physical and/or visual barrier between the children which minimizes the opportunity for conflict. Barriers or dividers of various types have been installed for isolating passengers in the rear seat of a motor vehicle. As can be expected, barriers suitable for children traveling in a family vehicle may require some measure of physical and visual isolation, but are subject to quite different requirements than are normally considered as useful for transporting prisoners, for example, or for traveling with domesticated animals.

Among considerations for providing a divider solution that is suitable for children, in conformance with passenger safety and restraint requirements, and practical for family use are the following:

(i) Suitable dimensions and weight. A rear-seat divider should be of sufficient dimension to obstruct, or at least discourage, physical and visual contact between the children seated on each side of it. At the same time, such a divider should not obstruct visibility for the driver. Adult passengers in the front seat may still need access to the children during travel, which also sets some dimensional constraints. Other factors relative to size include practical considerations such as accessibility for the children, so that the divider can remain in place and allow the children to enter or to depart from the vehicle from either driver-side or passenger-side doors, crossing past the divider without undue complication.

(ii) Adaptability to different types of motor vehicles. Different sizes, makes, and models of cars, pickup trucks, SUVs, and other motor vehicles have different arrangements of rear seat structures, including orientation angles, depth and height dimensions, curvatures, humps and other features. A suitable divider solution should be readily adaptable for any of a number of types of vehicles. In addition, a rear seat divider should be usable with any number of possible arrangements of child and infant car seats and carriers.

(iii) Construction. Construction materials for the divider should be suitably chosen considering factors such as how the material(s) would respond under collision impact, how well the material(s) hold the divider shape, material flammability, material durability, cleanability of surfaces, and other factors. Other practical considerations can include flotation ability of the materials. The material(s) used would preferably be compliant, compressible, and resilient, so that it does not compromise child safety or obstruct desired access or passage. There should be sufficient stiffness for holding its shape, without being overly rigid.

(iv) Simplicity of design and ease of use. Clearly, there would be advantages to a single-piece design, for reducing manufacturing cost and for making the rear seat divider easier to use and to store. There would also be advantages in making the rear seat divider easily removable so that it could be transferred from one vehicle to the next, for example, without the need to remove and remount auxiliary bracing or fastening hardware.

(v) Conformance to conventional restraint mechanisms and regulations. Safety regulations for child travel include requirements for both shoulder belt and lap belt restraint, child seat sizing/type/orientation, and other regulatory requirements. A suitable rear seat divider must be readily conformable to these requirements, so that it does not prevent the children from being appropriately strapped in.

(vi) Secure and stable mounting and installation. This consideration relates to each of the requirements given in (i)-(v) above and must take into account some normal movement and shifting and some amount of flexure and abuse.

In addition to these considerations, other useful considerations can include making the divider device more compact, such as for shipping and storage, minimizing or eliminating number of parts, particularly small parts with the potential of causing a choking hazard, use of recyclable materials, durability of surfaces to staining, soiling, and ultraviolet light exposure, and so on.

While a number of rear seat divider or barrier devices have been proposed, however, there is certainly room for improvement. Existing designs tend to fail to adequately meet some or all of the general requirements (i)-(vi) just listed. For example: U.S. Pat. No. 5,971,487 entitled "Automobile Seat Divider for Children" to Passehl describes a rectangular divider that separates the rear seat into two sections; however, the device shown falls short of what is needed for adaptability (ii, above) since it is designed for a particular configuration of automobile seats. The Passehl '487 device also fails to satisfy accessibility criteria given in (i) above, since it must be moved out of place in order to allow child access across the middle of the car in loading or unloading. Its rigid foam core, sandwiched between layers of softer foam material, gives the device some rigidity but may crack over time if stressed in a sideways direction, weakening the constraint mechanism provided by the single seat belt.

Another example of a rear seat divider that fails to meet requirements (i) through (v) above is given in U.S. Pat. No. 6,142,574 entitled "Car Seat Divider Construction" to Alexander. The s-shaped design of the device disclosed is even more limited than Passehl '487 shows, and would not likely be suitable for all types of motor vehicles, failing to meet the adaptability criteria noted in (ii) above. The height dimension shown in the Alexander '487 patent could easily obstruct driver visibility through the rear view minor, thus failing to meet criteria for dimensioning given in (i) above. Auxiliary mounting hardware appears to be necessary, failing to satisfy criteria for simplicity given in (iv) above.

Thus, it can be seen that, although there have been a number of attempts to provide a suitable solution for providing a rear seat divider that meets the needs of parents and children, there remains a need for a device that is suitably sized and constructed, that is adaptable to a wide range of vehicle types, that is simple to install and use, and that conforms with conventional child restraint mechanisms.

SUMMARY

It is an object of the present invention to address the need for a rear seat divider for a motor vehicle that reduces opportunities for visual and physical contact between children and meets various criteria for practicality and ease of use.

It is an advantage of the present invention that it can be adapted for use in any of various types of motor vehicle and is usable with various arrangements of car seats for children.

It is a feature of the present invention that it is a single free-standing element that can be securely mounted in place without the need for additional hardware, using the standard arrangement of lap and shoulder restraint belts and other restraint devices used in motor vehicles.

These objects, advantages, and features are given by way of illustrative example. Other desirable objectives and advantages inherently achieved by the disclosed invention may occur or become apparent to those skilled in the art.

According to one embodiment of the present invention, there is provided a divider for a rear seat of a motor vehicle, the divider formed as a single, free-standing element comprising:
 a block that is compressible and has shape memory, wherein the block comprises a pliable covering and has a base and a back surface;
 a lap restraint belt interface comprising a first slot that extends through the block for accepting an inserted lap restraint belt and wherein the first slot is oriented for compressively urging at least a portion of the base against a bottom surface of the rear seat and a portion of the back surface toward a backrest when the inserted lap restraint belt is engaged;
 and
 a second interface for accepting a second restraint device and oriented for adding a compressively urging force at least toward the backrest of the rear seat when the second restraint device is engaged.

BRIEF DESCRIPTION OF THE DRAWINGS

The foregoing and other objects, features, and advantages of the invention will be apparent from the following more particular description of the embodiments of the invention, as illustrated in the accompanying drawings. Elements of the drawings are not necessarily to scale relative to each other. Dimensional and spatial relationships may be represented in a compressed or exaggerated manner in order to illustrate principles or features of particular interest.

DETAILED DESCRIPTION

Figure 1A:
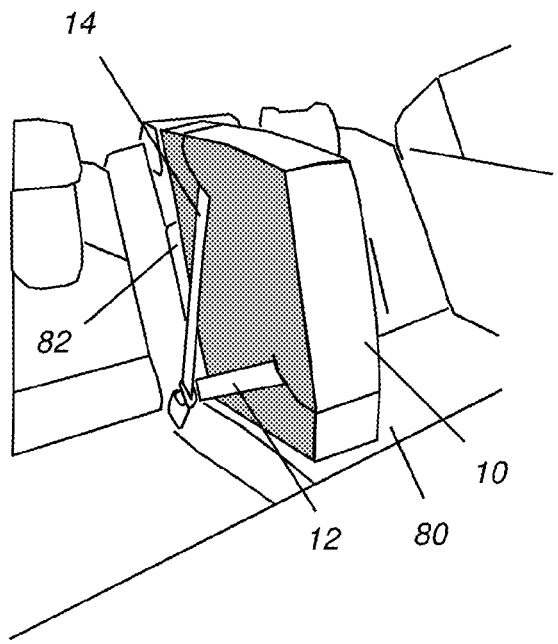
FIG. 1A shows a perspective view of a rear seat divider in position according to one embodiment.

The following is a detailed description of the preferred embodiments of the invention, reference being made to the drawings in which the same reference numerals identify the same elements of structure in each of the several figures. Elements not specifically shown or described may take various forms well known to those skilled in the art.

The 'coefficient of friction' (COF), also known as a 'frictional coefficient' or 'friction coefficient' is a dimensionless scalar value, ranging from near 0 to greater than 1, that describes the ratio of the force of friction between two bodies and the force pressing them together. In any particular case, the coefficient of friction depends on the materials that interface; for example, ice on steel has a low coefficient of friction, while rubber on pavement has a high coefficient of friction. In the context of the present disclosure, the coefficient of friction between two materials is of interest. In the context of the present invention, two materials are defined to have "frictional grip" or frictional contact if the coefficient of friction between them is >0.4, or preferably >0.6, or more preferably >0.8.

Apparatus and methods of the present invention provide a rear seat divider for use adjacent to a seated child in a motor vehicle, wherein the rear seat divider, unlike other proposed devices, meets the criteria given previously in the background section for being lightweight and compact (i), adaptable to different motor vehicle types (ii), of suitable construction (iii), simple in design and use (iv), in conformance with conventional restraint mechanisms (v), and allowing stable mounting (vi). The seat divider is constructed as a single, free-standing element, not requiring the installation of additional hardware, but instead using the lap and shoulder restraint belts of the motor vehicle or other available restraint devices for providing a stable and sturdy divider.

Figure 1B:
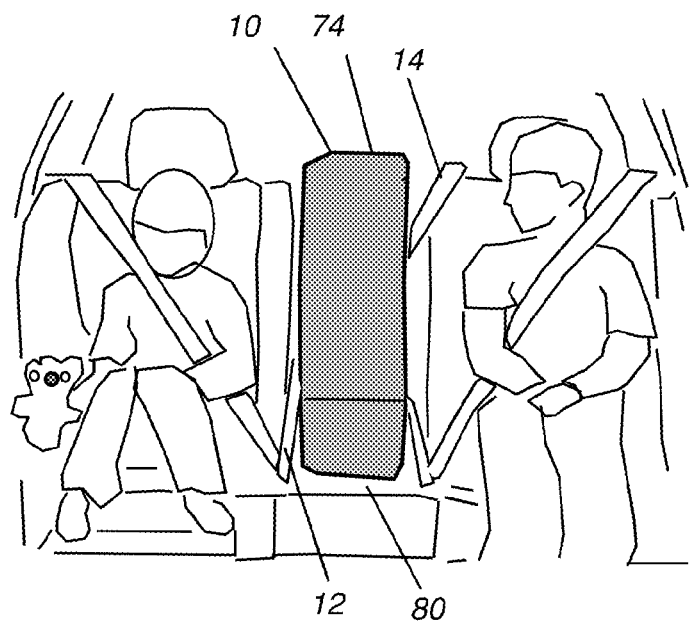
FIG. 1B is a front view of a rear seat divider in position.

FIGS. 1A and 1B are perspective and front views, respectively, of a rear seat divider 10 in position in a motor vehicle according to one embodiment. Seat divider 10 fits into the middle seat space in the rear seat of an automobile or other type of motor vehicle and is held in place by a lap restraint belt 12 and a shoulder restraint belt 14 for that seat position. With restraint belts 12 and 14 engaged, seat divider 10 is compressively urged against a seat bottom surface 80 and a backrest 82. A pliable covering 74, such as a cloth cover or cover made from some other type of pliable material, is provided over one or more surfaces of divider 10.

Pliable covering 74 may be formed from any of a number of suitable types of materials, including cotton, wool, fleece, suede, leather, plastic, rubber, vinyl, neoprene, urethane/polyurethane, polyester, polyethylene, nylon, microsuede, or various other types of natural or synthetic fabrics, for example. Pliable covering 74 may be stitched, molded, glued, ultrasonically or thermally welded, or otherwise formed and then applied over a foam or other core material or may be inflatable. Pliable covering 74 may be attached to a core material, such as using a zipper or other fastener, including a loop and hook type fastener, for example. In an alternate embodiment, pliable covering 74 is formed by a coating or skinning process that applies a material onto a foam or other core, forming a skin over the core material. In one example embodiment, the skin that serves as pliable covering 74 is formed of the core material itself via an in-mold processing that gives a surface of a material a more robust structure.

For an inflatable embodiment of divider 10, pliable covering 74 is itself inflatable, formed, for example, from a rubber or rubberized or rubber-lined or -coated material, such as a rubber-reinforced textile, or formed from a plastic, PVC, urethane/polyurethane, polyester, polyethylene, neoprene or other synthetic material or coated material that is capable of being configured to provide an air-tight bladder. A suitable material for inflatability may include an inner rubberized lining of a textile for providing an air-tight bladder coupled with an outer fabric that provides an alternate texture or appearance, for example.

Figure 2:
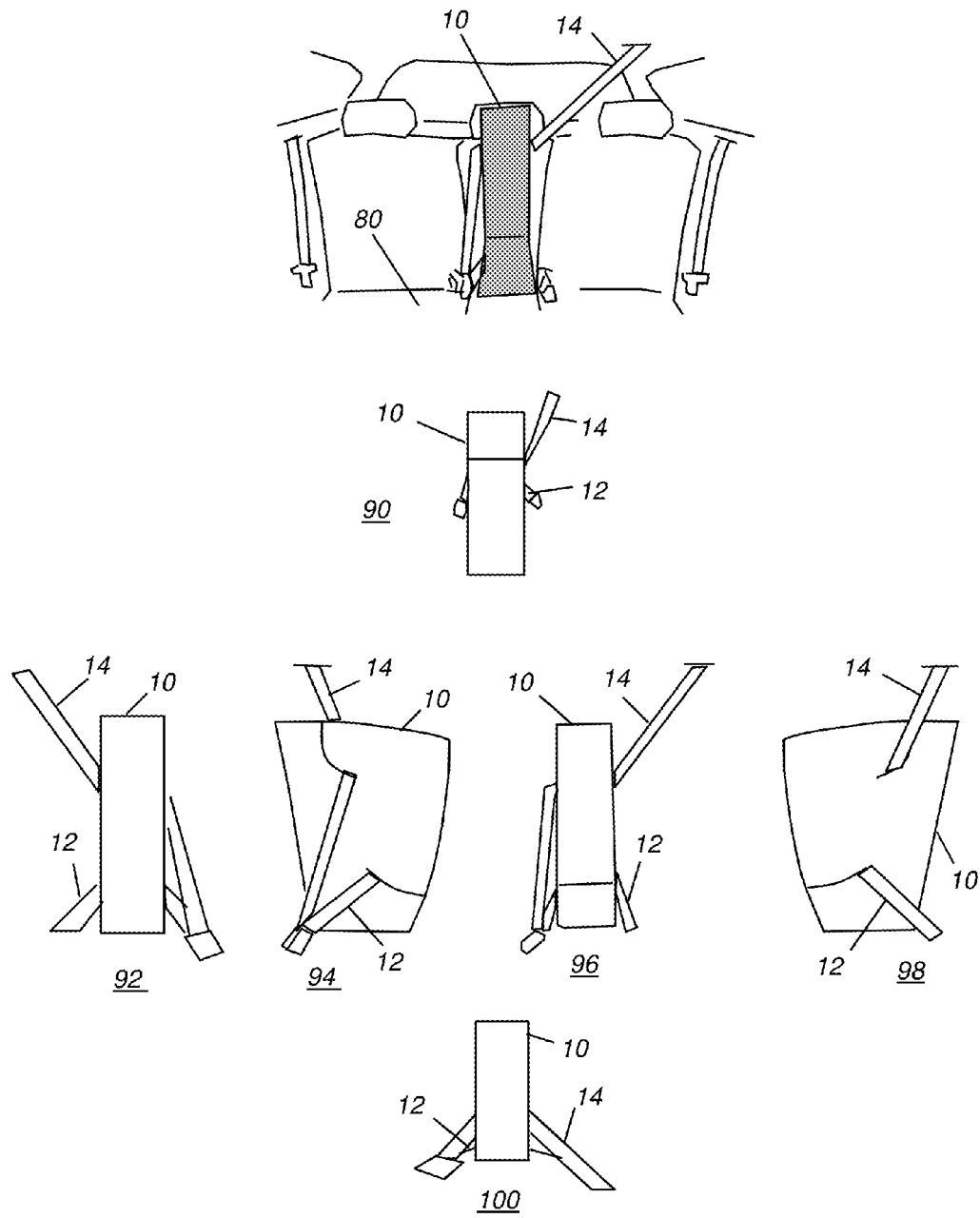
FIG. 2 shows views of each surface of the rear seat divider in position according to one embodiment.

FIG. 2 shows rear seat divider 10 in position and shows a top view 90, a rear view 92, side views 94 and 98, a front view 96, and a bottom view 100 of rear seat divider 10 in position in an automobile, with shoulder and lap restraint belts 14 and 12 engaged, according to one embodiment. As the views of FIGS. 1A, 1B, and 2 show, rear seat divider 10 is a low-profile device and is dimensioned so that it does not obstruct driver visibility out the rear window of the motor vehicle. Because its forward extension is typically no further than the front edge of the rear seat, as shown in FIG. 1A, for example, rear seat divider 10 allows passage across the middle of the vehicle for children climbing into or out of their seats on either the passenger or driver side. This allows the children to enter or exit the vehicle from the door on either side, both a convenience and, potentially, an escape access consideration (as in when entering/exiting a vehicle parked alongside a busy road or in an escape situation). In one embodiment, the height of seat divider 10 is no more than about 3 inches higher than the height of the backrest for a standard motor vehicle, preferably no higher than the height of the backrest or even shorter than this height. A typical height dimension is about 20-24 inches in one embodiment, tall enough to provide a visual divider for child occupants of the rear seat, but short enough so as not to obstruct driver rear-view visibility. The depth of the seat divider extends forward to no more than about 3 inches beyond the edge of seat bottom surface 80, preferably within no more than about 1 inch longer than the front edge of the rear seat, more preferably not extending forward as far as the edge of the rear seat. A typical depth dimension for the base of divider 10 in one embodiment of the present invention (with depth being in the direction from the front surface of the rear seat to the backrest) is about 14-18 inches. The width of divider 10 is about 6 inches in one embodiment, but can be thicker or thinner that this value based on materials such as the material used to form the device, for example.

Figure 3A:
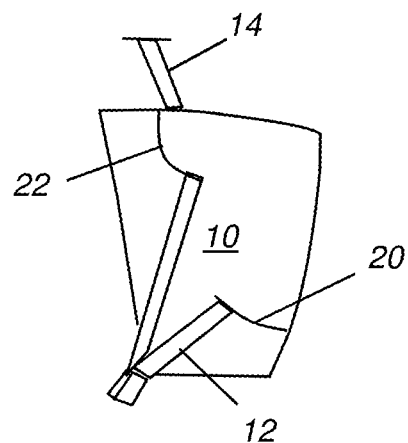
FIGS. 3A and 3B show side views of the rear seat divider with lap and shoulder restraint belts fastened, in an embodiment using separate slots for each restraint belt.
Figure 3B:
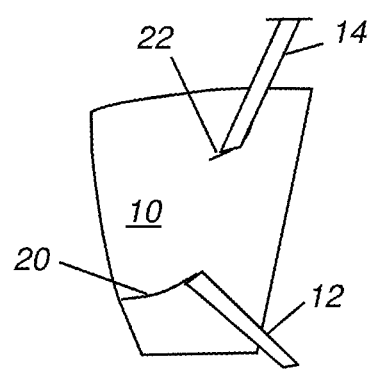

FIGS. 3A and 3B show side views of the rear seat divider with lap and shoulder restraint belts fastened, in an embodiment using separate slots for each restraint belt. In the embodiment shown, a lap restraint belt slot 20 is cut inward from the front surface of rear seat divider 10. A shoulder restraint belt slot 22 is a slot cut inward from the top surface in this embodiment.

Figure 3C:
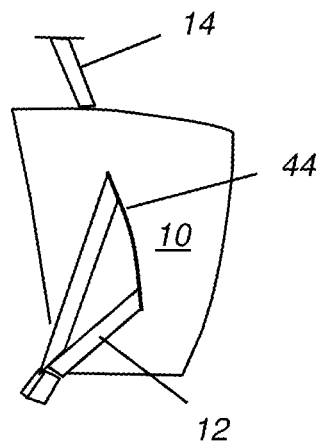
FIGS. 3C and 3D show side views of the rear seat divider with lap and shoulder restraint belts fastened, in an embodiment using a single slot for both restraint belts.
Figure 3D:
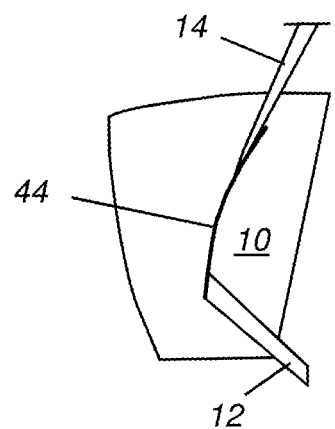

FIGS. 3C and 3D show side views of the rear seat divider with lap and shoulder restraint belts fastened, in an embodiment using a single slot 44 for both restraint belts. In one embodiment, slot 44 is preferably long enough on one side of divider 10 (FIG. 3D) to accommodate insertion of both lap and shoulder restraint belts 12 and 14, but may be shorter on the other side (FIG. 3C) to accommodate lap and shoulder restraining belt exit. Although slot 44 could be made equally long on both sides, this tapered design and small exit hole size can be effective deterrents for children who may be inclined to try to stick their hands through the slot, such as to reach the child on the opposite side.

Materials

Rear seat divider 10 can be formed from a block 76 that is compressible and has a shape memory. Block 76 can be in the form of an inflatable bladder, for example, or formed from any of a number of compressible core materials. One property of particular interest relates to resiliency, that is, the ability of the material to spring back to its original shape after being compressed for some period of time. In the context of the present disclosure, a material having this property of resiliency or shape recovery is considered to have "shape memory". Materials that have shape memory include an inflatable bladder as well as various types of resilient foam materials such as various types of closed- or open-cell polyurethane, for example, that can be compressed and, when the compressive force is released, substantially recover their original shape. Compressible, resilient foam materials are compliant to surrounding surfaces when compressed and are able to return to their original shape when the compressive force is removed. Materials of this type are commonly used for furniture and portable seat cushions, for example, and are provided with a fabric or other type of pliable covering, such as a plastic coating that forms a pliable covering, or encased in a vinyl or other type of pliable coating. Compressible foam materials are rated according to various performance factors, including their Indentation Force Deflection (IFD), which indicates the amount of force needed to indent up to 25% of its thickness a 4-inch-thick sample of foam. Density, typically given in pounds per cubic foot, is another factor that is used to rate such materials. It should be noted that embodiments of the present invention for a compressible block do not require highly dense materials or materials over a given IFD range.

The compressive forces that are applied to the rear seat divider are in the moderate range applied from lap and shoulder restraint and other types of restraint devices. Higher density materials are advantaged for overall durability. Lower density materials are advantaged for minimizing rear seat divider weight and cost. Higher IFD materials are advantaged for providing a level of firmness or overall integrity to the rear seat divider.

Other viable materials that can be used to provide a block of core material for rear seat divider 10 include, for example, molded, closed-cell or open-cell self-skinning foams. The latter of these has the advantage of improved resistance to fluids, bacteria, mold, etc.

Frictional contact for enhancing the frictional grip between the rear seat divider and typical automobile seat and restraint belt materials is advantageous in order to discourage slippage or sliding along the plane, arc, or general area of surface contact, and to generally aid in stabilizing the rear seat divider in the automobile. For this purpose, one or more of the rear or base contact surfaces or the belt interface surfaces of divider 10 can comprise an optional material for enhanced friction, such as a material taken from the group consisting of a polyurethane foam material, fleece, felt, flannel, cotton, rubber, silicone, polymer, suede, microsuede, and leather. One or more of the contact surfaces can comprise a "non-slip" material and/or structure specifically engineered to have enhanced frictional grip in combination with other materials.

Figure 4A:
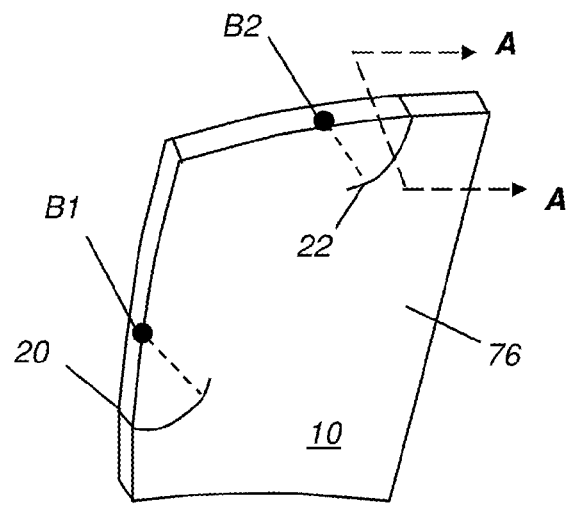
FIG. 4A shows a side view of the rear seat divider having arcuate slots.

FIG. 4A shows a side view of the rear seat divider formed from a block 76 that is compressible and has a shape memory. In one embodiment, block 76 is formed from a compressive, resilient core material with shape memory and having arcuate slots 20 and 22 for their corresponding restraint belts. The relative direction of arcuate slots 20 and 22 is shown, with approximate arc centers B1 and B2 as indicated. While not the only workable slot arrangement for the rear seat divider, this particular open slot orientation has been found to be advantageous for ease of installing seat restraint belts and for providing the needed frictional grip and compressive forces for holding the divider securely in position against the seat bottom and backrest, as described in more detail subsequently.

Figure 4B:
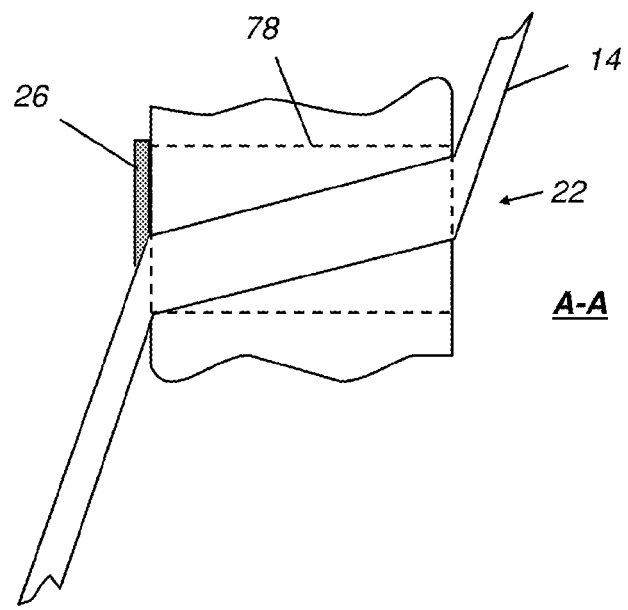
FIG. 4B is a partial cross-sectional view showing the interface surface for providing frictional contact against a restraint belt.

FIG. 4B is a partial cross-sectional view of slot 22 showing an interface surface 78 for providing frictional contact against shoulder restraint belt 14. When block of core material 76 is a compressible foam material with shape memory, interface surface 78 may be untreated, since the compressible foam provides sufficient frictional grip against the surface of shoulder restraint belt 14. A similar interface arrangement can be used for slot 20. Alternately, interface surface 78 can be treated, such as by application of a coating that provides additional friction, for example. An optional clip 26, such as a plastic clip that is coupled to seat divider 10, can also be provided on either or both sides of the slot for increased grip against the restraint belt. The belt contact surface at each belt interface should provide frictional contact with the belt at a level that is sufficient to discourage slippage of the belt against the contact surface.

One or more of the rear or base or belt contact surfaces can comprise a material taken from the group consisting of a polyurethane foam material, fleece, felt, flannel, cotton, rubber, silicone, polymer, suede, microsuede, and leather. One or more of the contact surfaces can comprise a "non-slip" material and/or structure specifically engineered to have enhanced friction in combination with other materials. Examples of commercially available non-slip materials for this purpose include, but are not limited to ECO PER® Non Slip Fabric from PracticalSurfaceWare, Buckinghamshire, UK; Jiffy Grip brand traction material or Slipper Grippers, both available from JoAnn Stores, Inc., Hudson, Ohio; and Lattice Non Slip Fabric and Mesh Lattice Non Slip Fabric from NonSlip Tapes LLC, East Butler, Pa. Alternately, one or more of the contact surfaces can have its friction enhanced by the addition of "non-slip" patches such as, for example, "GRiPPiES No-Slip Adhesive Shapes," from GRiPPiES, LLC of Long Island, N.Y., or by the addition of "non-slip" tape such as, for example, Anti Slip Grip Tape from NonSlip Tapes LLC, East Butler, Pa. There can be at least one retaining clip for either the lap restraint belt or the shoulder restraint belt.

Figure 5:
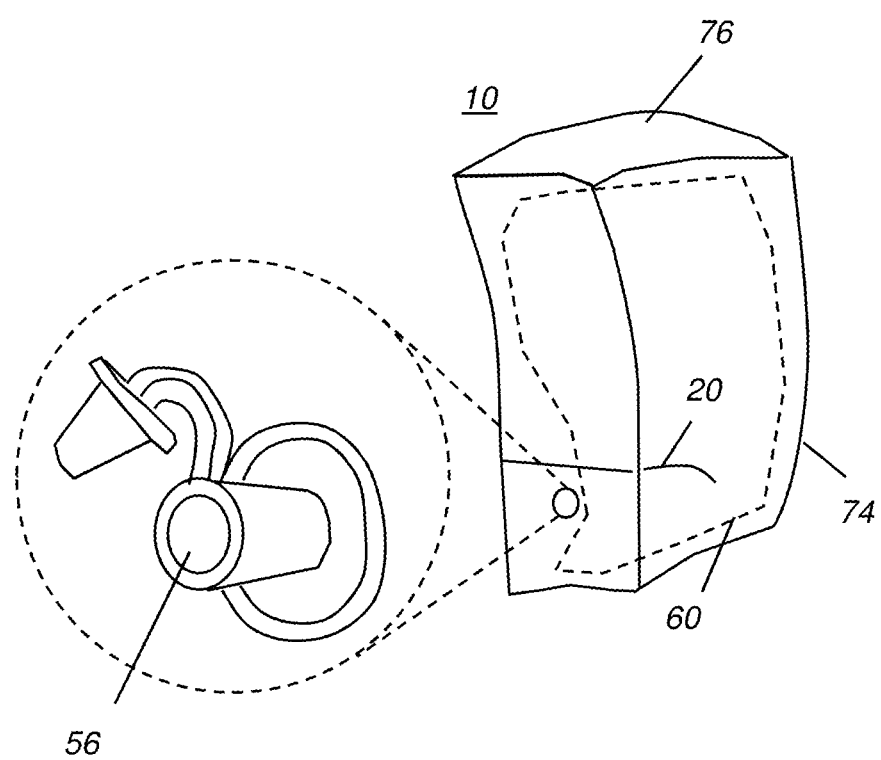
FIG. 5 is a perspective view that shows an embodiment for an inflatable rear seat divider.

In an alternate embodiment, as shown in FIG. 5, seat divider 10 is provided as an inflatable device having a nozzle 56, shown in enlarged form. In this embodiment, pliable covering 74 is formed to provide an inflatable bladder 60 of air, shown in dashed line form in FIG. 5. This forms block 76 so that it is compressible and also has shape memory, so that it recovers its shape when not compressed. Slots 20 and 22, formed by the pattern of inflatable pliable covering 74, extend through block 76 for accepting the appropriate restraint belts. In addition, an inflatable version has advantages for packaging, shipping, and storage of rear seat divider 10, since it allows inflation at any time and also permits deflation when not in use. Some portion or all of divider 10 can be made inflatable. An internal air bladder 60 that is separate from and lies within pliable covering 74 can be provided, for example, so that an adult can adjust the stiffness of divider 10 to a suitable setting. As with foam core embodiments, interface surfaces for contact against the restraint belt or motor vehicle seat can use a material that provides a frictive contact with enhanced frictional grip, such as those described previously.

As was shown in FIG. 1A, pliable covering 74 may be provided over some or all surfaces of block 76, depending on whether an inflatable or foam core design is used. This allows relatively high coefficients of friction to be obtained, regardless of bulk material construction of inner portions of the divider, with appropriate choice of pliable coverings such as, for example, fleece, flannel, felt, cotton, rubber, silicone, polymer, suede, microsuede, or leather materials or other non-slip materials previously described. Additionally, the belt, back, or base contact areas of the cover may comprise different materials than the other sections of the pliable covering (e.g., rubber for the contact areas and fleece for the non-contact areas). In the case of a self-skinning foam with no different type of pliable covering material and effectively forming its own pliable covering by self-skinning, improvements in coefficient of friction can be obtained with the addition of surface features or roughness to the contact areas of the divider. In any case, the contact areas of the divider provide sufficient frictional contact to discourage slippage or sliding contact, both against restraining belt fabric, which is typically a synthetic material, and against materials conventionally used for automobile seat components.

Frictional contact against the seat material of the rear seat and against lap and shoulder restraining belts helps to stabilize seat divider 10. The frictional contact helps to constrain twisting, tipping/tilting, lateral movement, or other unwanted shifting or other motion of rear seat divider 10. In an alternate embodiment, stiffness over at least a portion of divider 10 is reduced, allowing the seated child to cling to the rear seat divider as a toy. Of course, the rear seat divider may be removed and function as a toy outside of the vehicle as well.

Figure 6A:
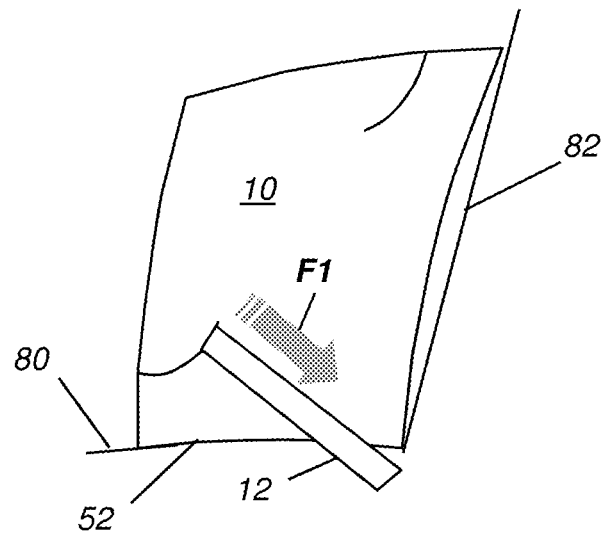
FIG. 6A shows the compressive force that is applied by the lap restraint belt according to an embodiment of the present invention.

Referring back to FIGS. 3A-3D, whichever slot arrangement is used, the slot orientation allows the rear and back surfaces of rear seat divider 10 to be compressively held against the bottom surface of the rear seat and against the backrest. The side view of FIG. 6A shows the compressive force that is applied by lap restraint belt 12 according to an embodiment of the present invention. Lap restraint belt 12, when inserted through slot 20 and engaged, provides an urging force F1, a component of which compressively urges at least a portion of a base contact surface 52 of the divider against seat bottom surface 80 of the motor vehicle. Similarly, a component of this compressive force also urges the divider against the backrest 82. Alternately, urging force F1 can be considered to urge divider 10 toward the intersection of the bottom surface of the rear seat and the backrest.

Figure 6B:
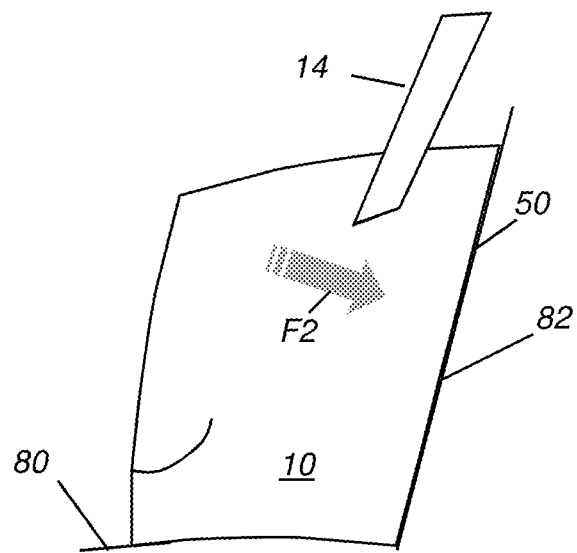
FIG. 6B shows the compressive force that is applied by the shoulder restraint belt according to an embodiment of the present invention.

FIG. 6B shows the compressive force that is applied by shoulder restraint belt 14 according to an embodiment of the present invention. Shoulder restraint belt 14, when inserted through slot 22 and engaged, provides a component of urging force F2 that urges at least a portion of a rear contact surface 50 of the divider against seat backrest 82 of the motor vehicle. Another component of this urging force may be directed downwards against seat bottom surface 80.

Figure 6C:
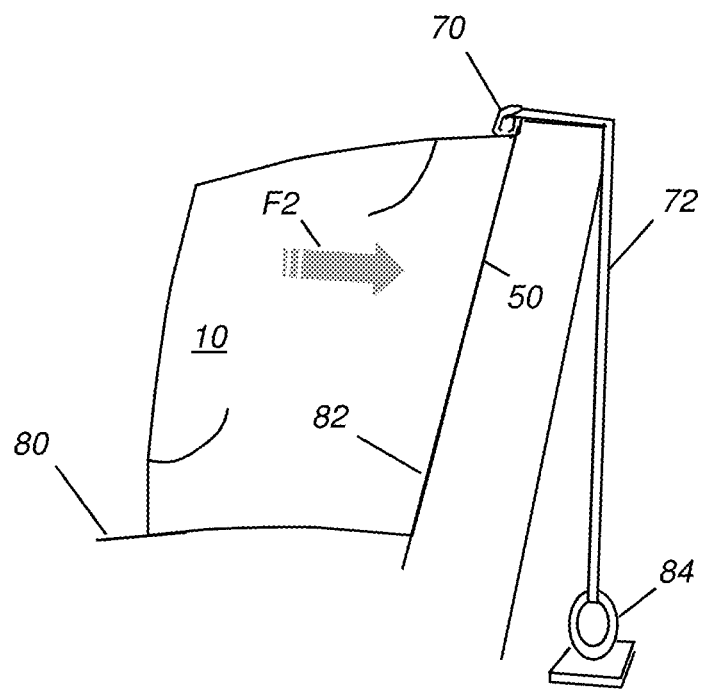
FIG. 6C shows the compressive force that is applied by an alternate restraint device according to an embodiment of the present invention.

The side view of FIG. 6C shows the compressive force that is applied by an alternate restraint device according to an embodiment of the present invention. A belt 72 connects a loop 70 on divider 10 to a fastener 84 or other type of anchor, such as a LATCH (Lower Anchors and Tethers for Children) tether and fastening device common in many types of passenger vehicles and used for car seats and similar devices. This also provides an urging force F2 that urges at least a portion of a rear contact surface 50 of the divider against seat backrest 82 of the motor vehicle.

It should again be noted that the urging forces shown as F1 and F2 each provide some measure of compression of divider 10 against seat bottom surface 80 and backrest 82. This helps to provide a compressive fitting of divider 10 securely against these portions of the passenger seat and enhances friction with respect to the passenger seat. The interface with shoulder restraint belt 14 (or with the LATCH device as shown in FIG. 6C) helps to further stabilize divider 10.

Figure 7:
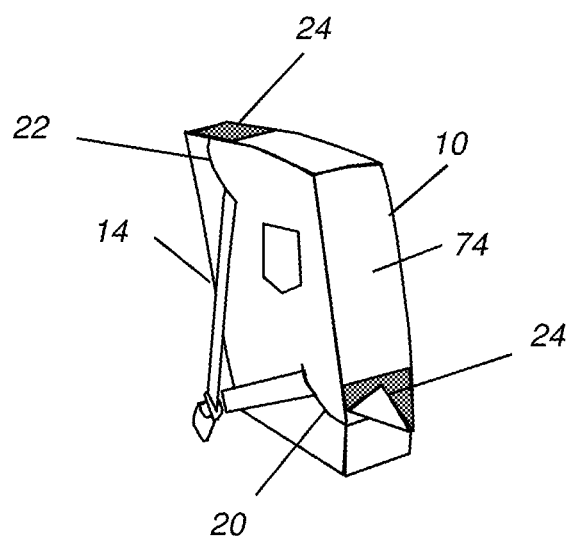
FIG. 7 is a perspective view that shows an embodiment of the rear seat divider that uses protective flaps.

The perspective view of FIG. 7 shows some optional features that can be added to rear seat divider 10 in alternate embodiments. One or more pockets 28 can be sewn into or otherwise affixed to pliable covering 74, for example. One or more optional flaps 24 can also be attached, serving to cover slots 20 and 22 as shown. Additionally, one or more loops or similar attachment features can be added for attaching toys, pacifiers, blankets, bottles, cups, and other objects as desired.

Figure 8A:
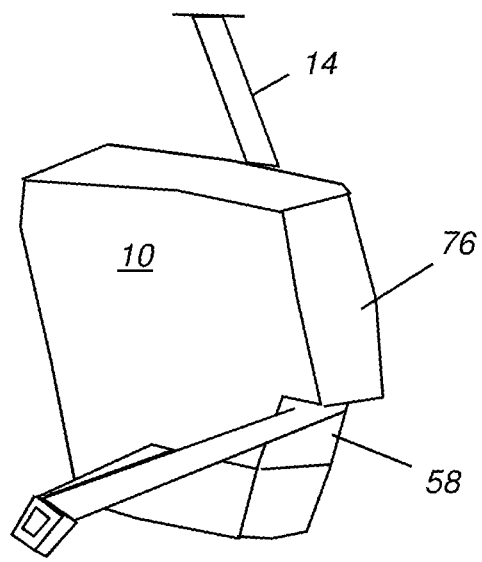
FIGS. 8A and 8B are perspective views that show an alternate embodiment wherein the shoulder restraint belt has an interface along the front surface of the rear seat divider.
Figure 8B:
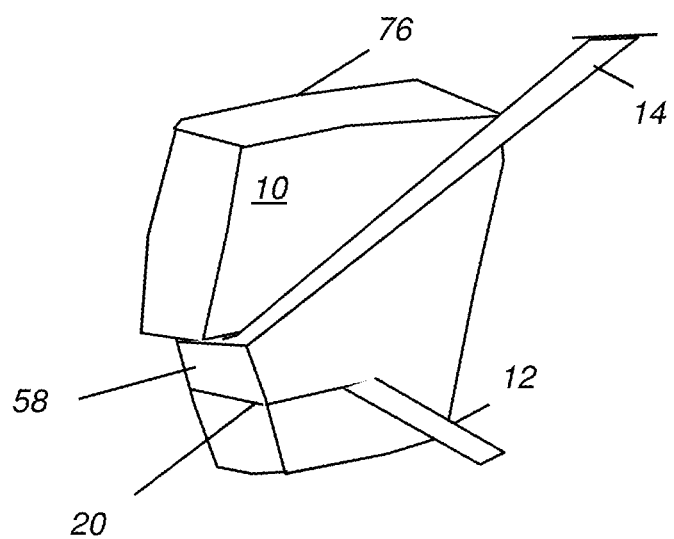

The perspective views of FIGS. 8A and 8B show an embodiment in which block 76 has a notched shape so that interface for lap belt 14 extends across a front surface 58 of rear seat divider 10.

Figure 9A:
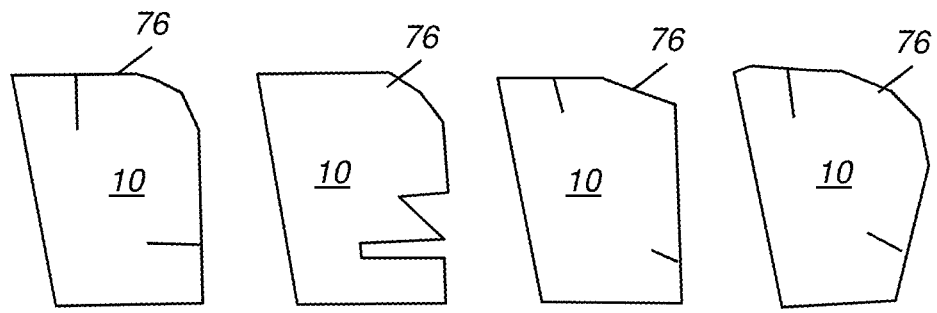
FIG. 9A shows side views of various alternative slot and shape arrangements for the rear seat divider.

It can be appreciated that rear seat divider 10 can have a number of different shapes and slot arrangements in different embodiments of the present invention. For example, FIG. 9A shows side view profiles of rear set divider 10 itself in various embodiments. As shown in FIG. 9A, the single, free-standing element can have any of a number of variations in overall shape and block 76 may include cut-out portions that improve access for its installation or removal or provide a more appealing appearance.

Figure 9B:
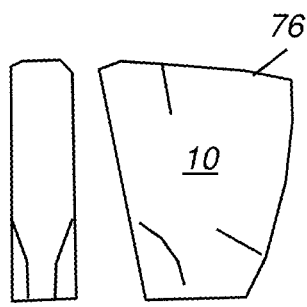
FIG. 9B shows a rear and side view of the rear seat divider with indentations formed in the block of core material, allowing improved access to restraint belt connections.

FIG. 9B shows a rear and side view of the rear seat divider with indentations formed in the block of core material, allowing improved access to restraint belt connections. The cut-out portions can improve access to the inner buckle/connector of the side seating positions as well, thereby facilitating insertion/removal of children and/or their safety seats.

Figure 9C:
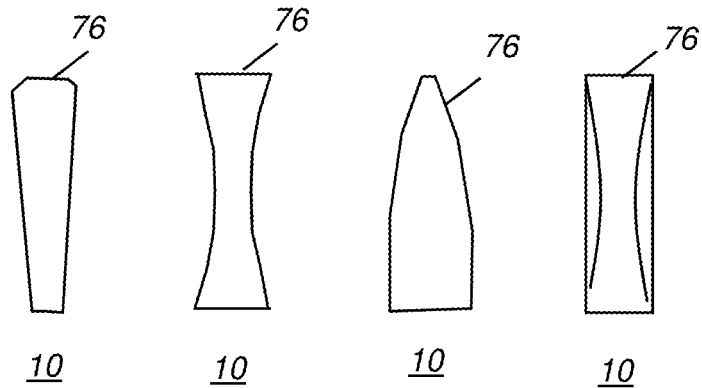
FIG. 9C shows front views of the rear seat divider with various shape profiles.

Further adaptations to the shape profile are shown in the front views of FIG. 9C. These modifications can include broadening the base portions, narrowing side or top portions, and other changes.

Figure 10A:
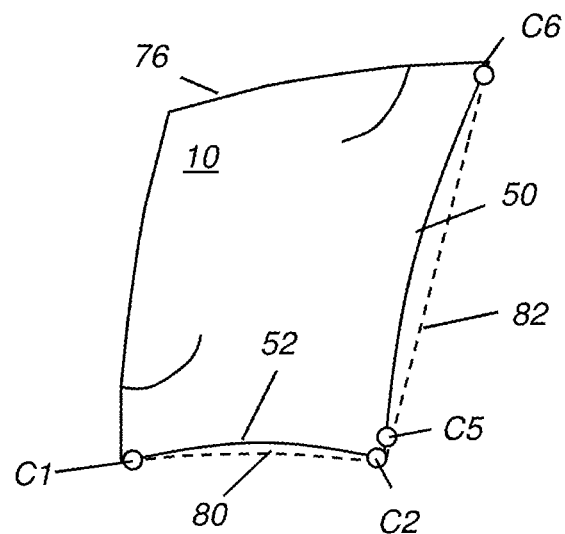
FIG. 10A shows a side view of the rear seat divider with curvature.
Figure 10B:
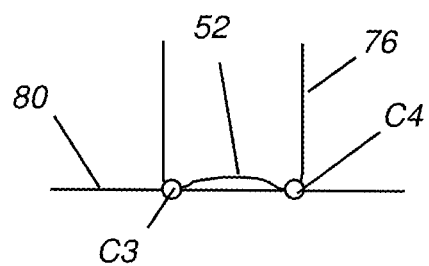
FIG. 10B shows a partial view of the base of the rear seat divider, with curvature.

With reference to FIGS. 10A and 10B, one difficulty noted above for conventional rear seat dividers relates to adapting these devices for use with different types of motor vehicles and seating. Use of frictional contact surfaces for rear and base contact surfaces 50 and 52 against surfaces 82 and 80, respectively, and for lap and shoulder restraint belt interfaces, provides a measure of stability for holding rear seat divider 10 in place. However, not all rear seat designs have the same geometry, with respect to factors such as the relative angle between backrest 82 and seat bottom surface 80 and front-to-back curvature of the seat portion and, considered orthogonally from side to side, with respect to the shape of the mid-section of the rear seat. Rear seats in some automobiles, for example, have a protuberance or hump in the mid-section; rear seats in others do not. Because of such differences in rear seat geometry, it can be difficult to maintain good frictional contact at all points.

Referring to the side view of FIG. 10A, rear seat divider 10 has curved rear and base contact surfaces 50 and 52 in the embodiment shown. Because of the relative flatness of the rear seat bottom 80 that is shown, there are two contact points C1 and C2, shown as open circles in FIG. 10A, for frictional contact between divider 10 and the rear seat bottom surfaces, considered from this side view. Considered in three dimensions, this means that there is contact between divider 10 and the rear seat along two lines, each line running orthogonal to the page as FIG. 10A is represented; each line intersecting one of points C1 and C2. This can be improved over single line contact, which can be the case with a convex seat and a flat rear seat divider surface (assuming poor conformance of the rear seat divider). In practice, a conformable rear seat divider with flat to mildly concave surfaces has been found to conform well to a variety of rear seats when under mild compression, providing broad areas of contact for enhanced friction and stability.

FIG. 10B shows an embodiment with base contact surface 52 having a concave curvature along a direction orthogonal to that shown in FIG. 10A. The contoured arrangement shown in FIG. 10B now provides contact points C3 and C4 from this cross-sectional view. Considered in three dimensions, this means that there is contact between divider 10 and the rear seat along two lines, each line orthogonal to the page as FIG. 10B is represented, one line intersecting C3, the other intersecting C4. The same approach can be taken along rear contact surface 50 with respect to its contact points shown at C5 and C6. In this way, by providing concave curvature to one or both rear and base contact surfaces 50 and 52, the same considerations described above for FIG. 10A become apparent here. As in FIG. 10A, this embodiment is most advantaged for convex seat geometries. In practice, a conformable rear seat divider with flat to mildly concave surfaces has been found to conform well to a variety rear seats when under mild compression, providing broad areas of contact for enhanced friction and stability.

The contoured arrangement of these surfaces can be advantageous when used in combination with shoulder and lap restraint belts 14 and 12. Referring to the side view of FIG. 10A, it can be appreciated that the curvatures of both rear and base contact surfaces change, urged toward the rear seat surfaces when the restraint belts are used. This effectively increases the radius of curvature for the contoured surfaces, increasing the surface contact area at the same time for a more stable seating of divider 10.

Rear seat divider 10 can be further outfitted with storage pockets, fold-down elements such as trays or holders, and other features. It may also have a see-through or pass-through hole or slot for visibility between adjacent children, for example. In addition, various design elements could be used to make rear seat divider 10 more appealing for younger children, such as using various graphical elements and approaches. Other embodiments include design of divider 10 as a plush toy article. Three-dimensional features formed in the pliable covering can be used for aesthetic purposes, such as to make divider 10 appear more desirable, for example, a face, a person, an animal, a robot, a brick wall, a cartoon character, a slice of watermelon, or anything else desired. Divider 10 (or its pliable covering) may also incorporate any conceivable two-dimensional graphical design as well, such as the features of a face or licensed character likeness or an abstract pattern or color, as desired. Of course, the divider can be made nondescript, such as in a neutral color, or may be made to match the automobile interior as well.

Regardless of the construction or restraint method, divider 10 is preferably easily cleanable. This is preferably achieved via an easily washable/wipeable surface or via a removable/washable fabric covering, for example. Alternately, or additionally, the divider could incorporate a stain-resistant surface for minimizing the need for cleaning.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

PARTS LIST

10. Divider
12. Lap restraint belt
14. Shoulder restraint belt
20. Lap restraint belt slot
22. Shoulder restraint belt slot
24. Flap
26. Clip
28. Pocket
30. Lap restraint belt interface
32, 34. Shoulder restraint belt interface
40. Lap restraint belt interface
42. Shoulder restraint belt interface
44. Slot
50. Rear contact surface
52. Base contact surface
56. Nozzle
58. Front surface
60. Inflatable bladder
70. Loop
72. Belt
74. Pliable covering
76. Block
78. Interface surface
80. Seat bottom surface
82. Backrest
84. Fastener
90. Top view
92. Rear view
94. Side view
96. Front view
98. Side view
100. Bottom view
B1, B2. Arc center
C1, C2, C3, C4, C5, C6. Contact point
F1, F2. Urging force

The invention claimed is:

1. A vertical divider for separating adjacent passengers in a rear seat of a motor vehicle, the divider formed as a single, free-standing element comprising:
a foam block that is compressible and has shape memory, wherein the block comprises a pliable covering and has a base, a front surface, a top surface, and a back surface and further has first and second side surfaces spaced apart from each other by the base, front surface, top surface, and back surfaces;
a lap restraint belt interface comprising a first slit that extends into the block from the front surface, wherein the first slit extends from the first side surface to the second side surface, for accepting an inserted lap restraint belt and wherein the first slit is further inclined upward toward the top surface for directing a first compressive force urging at least a portion of the base against a bottom surface of the rear seat and a portion of the back surface toward a backrest when the inserted lap restraint belt is engaged; and
a second slit that extends into the block from the top surface, wherein the second slit extends from the first side surface to the second side surface for accepting a second restraint device and wherein the second slit is further inclined toward the front surface for directing a second compressive force at least toward the backrest of the rear seat when the second restraint device is engaged.

2. The divider of claim 1 wherein at least a portion of a surface within the first slit is disposed to provide a frictional grip against the inserted lap restraint belt.

3. The divider of claim 1 wherein the second restraint device is a shoulder restraint belt.

4. The divider of claim 1 wherein at least one of the base and back surfaces comprise a material disposed to provide a frictional grip against the rear seat.

5. The divider of claim 1 wherein the second interface is a shoulder restraint belt interface within the first slit.

6. The divider of claim 1 wherein the pliable covering forms an inflatable bladder.

7. The divider of claim 2 wherein the portion of the surface within the first slit comprises a material taken from the group consisting of a polyurethane foam material, fleece, felt, flannel, cotton, rubber, silicone, polymer, suede, microsuede, and leather.

8. The divider of claim 1 wherein at least one of the first and second slits has an arcuate shape.

9. The divider of claim 1 wherein the block comprises a molded, self-skinning foam.

10. The divider of claim 1 wherein the pliable covering comprises at least one flap for covering the first or the second slit.

11. The divider of claim 1 wherein either the base or the back surface or both are concave in cross-sectional shape.

12. The divider of claim 1 further comprising one or more clips for securing the lap restraint belt or a shoulder restraint belt.

13. The divider of claim 1 wherein the second slit further adds a component of compressively urging force toward the bottom surface of the rear seat.

14. A vertical divider for separating adjacent passengers in a rear seat of a motor vehicle, the divider formed as a single, free-standing element comprising:
a block of a core material that is compressible and has shape memory, wherein the block comprises a pliable covering and has a base, a front surface, a top surface, and a back surface and further has first and second side surfaces spaced apart from each other by the base, front surface, top surface, and back surfaces;

a lap restraint belt interface comprising a first slit that extends into the block of the core material from the front surface, wherein the first slit extends from the first side surface to the second side surface for accepting an inserted lap restraint belt and wherein the first slit is further inclined upward toward the top surface for directing a first compressive force urging at least a portion of the base against a bottom surface of the rear seat and a portion of the back surface against a backrest when the inserted lap restraint belt is engaged;

and a second slit that extends through the block of the core material from the top surface, wherein the second slit extends from the first side surface to the second side surface for accepting a second restraint device and wherein the second slit is further inclined toward the front surface for directing a second compressive force at least toward the backrest of the rear seat when the second restraint device is engaged, wherein at least one of the first and second slits has an arcuate shape.

15. The divider of claim 14 wherein the core material is a foam material taken from the group consisting of a closed cell foam and an open cell foam.

16. The divider of claim 1 wherein a first distance between the first and second side surfaces is less than a second distance from the base to the top surface.

* * * * *